United States Patent
Herzig et al.

(10) Patent No.: US 11,270,061 B2
(45) Date of Patent: Mar. 8, 2022

(54) AUTOMATIC GENERATION OF TRAINING DATA FOR SCIENTIFIC PAPER SUMMARIZATION USING VIDEOS

(71) Applicant: International Business Machines Corporation, Armonk, NY (US)

(72) Inventors: Jonathan Herzig, Tel-Aviv (IL); Achiya Jerbi, Netanya (IL); David Konopnicki, Haifa (IL); Guy Lev, Tel-Aviv (IL); Michal Shmueli-Scheuer, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/799,865

(22) Filed: Feb. 25, 2020

(65) Prior Publication Data

US 2021/0264097 A1 Aug. 26, 2021

(51) Int. Cl.
*G06F 17/00* (2019.01)
*G06F 40/12* (2020.01)
*G06F 40/274* (2020.01)
*G06N 20/10* (2019.01)
*G06N 7/00* (2006.01)
*G06F 40/30* (2020.01)

(52) U.S. Cl.
CPC ............ *G06F 40/12* (2020.01); *G06F 40/274* (2020.01); *G06F 40/30* (2020.01); *G06N 7/005* (2013.01); *G06N 20/10* (2019.01)

(58) Field of Classification Search
CPC ........ G06F 40/12; G06F 40/30; G06F 40/274; G06N 20/10; G06N 7/005
USPC .......................................................... 715/254
See application file for complete search history.

(56) References Cited

U.S. PATENT DOCUMENTS 5,638,543 A * 6/1997 Pedersen ............... G06F 16/345
704/1
5,649,060 A * 7/1997 Ellozy .................. G11B 27/028
704/278
(Continued)

OTHER PUBLICATIONS

Lev, G. et al.,"TALKSUMM: A Dataset and Scalable Annotation Method for Scientific Paper Summarization Based on Conference Talks," (Jun. 13, 2019), arXiv:1906.01351v2, 7 pages.*
(Continued)

*Primary Examiner* — Mohammed H Zuberi
*Assistant Examiner* — James H. Blackwell
(74) *Attorney, Agent, or Firm* — Gregory J Kirsch

(57) ABSTRACT

Embodiments may provide techniques to generate training data for summarization of complex documents, such as scientific papers, articles, etc., that are scalable to provide large scale training data. For example, in an embodiment, a method may be implemented in a computer system and may comprise collecting a plurality of video and audio recordings of presentations of documents, collecting a plurality of documents corresponding to the video and audio recordings, converting the plurality of video and audio recordings of presentations of documents into transcripts of the plurality of presentations, generating a summary of each document by selecting a plurality of sentences from each document using the transcript of the that document, generating a dataset comprising a plurality of the generated summaries, and training a machine learning model using the generated dataset.

11 Claims, 4 Drawing Sheets

(56) References Cited

U.S. PATENT DOCUMENTS

| | | | | |
|---|---|---|---|---|
| 6,263,507 | B1* | 7/2001 | Ahmad | H04N 21/4622 725/134 |
| 6,990,634 | B2* | 1/2006 | Conroy | G06F 40/289 715/227 |
| 8,935,291 | B2 | 1/2015 | Chen | |
| 9,317,498 | B2 | 4/2016 | Baker | |
| 9,582,591 | B2 | 2/2017 | Vanderwende | |
| 10,185,711 | B1 | 1/2019 | Shires | |
| 2002/0174149 | A1* | 11/2002 | Conroy | G06F 40/289 715/227 |
| 2003/0187642 | A1* | 10/2003 | Ponceleon | G10L 15/1822 704/252 |
| 2012/0030157 | A1* | 2/2012 | Tsuchida | G06N 3/08 706/20 |

OTHER PUBLICATIONS

Fung, P. et al.,"Combining Optimal Clustering and Hidden Markov Models for Extractive Summarization,", in MultiSumQA '03: Proceedings of the ACL 2003 workshop on Multilingual summarization and question answering—vol. 12, Jul. 2003 pp. 21-28.*

Fung, P.,"One Story, One Flow: Hidden Markov Story Models for Multilingual Multidocument Summarization," ACM Transactions on Speech and Language Processing, vol. 3, No. 2, Jul. 2006, pp. 1-16.*

Conroy, J. et al.,"Text Summarization via Hidden Markov Models and Pivoted QR Matrix Decomposition," (2001), pp. 1-20.*

Beamer, B. et al.,"Investigating Automatic Alignment Methods for Slide Generation from Academic Papers," (2009), pp. 111-119.*

Allahyari, M. et al.,"Text Summarization Techniques: A Brief Survey," (2017), arXiv, 9 pages.*

Altmami, N.I. et al.,"Automatic Summarization ofScientific Articles," Journal of King Saud Univ. (2020), 18 pages.*

Barzilay, R. et al.,"Sentence Fusion for Multidocument News Summarization," (2005) Association for Computational Linguistics, vol. 31, No. 3, pp. 297-327.*

Das, D. et al.,"A Survey of Automatic Text Summarization," (2007), pp. 1-31.*

Druck, G. et al.,"Spice it Up? Mining Refinements to Online Instructions From User Generated Content," (2012), ACL, pp. 545-553.*

Erera, S. et al.,"A Summarization System for Scientific Documents," (Aug. 29, 2019), arXiv, 6 pages.*

Hayama, T. et al.,"Alignment between a Technical Paper and Presentation Sheets Using a Hidden Markov Model," (2005), IEEE, pp. 102-106.*

Konopnicki, D. et al.,"Making Sense of Science with Discovery Augmented Summarization," (Jul. 28, 2019), IBM Research Blog Post, 5 pages.*

Yao, Jin-ge et al.,"Recent Advances in Document Summarization," (2017), Springer, pp. 297-336.*

Naim, I.,"Unsupervised Alignment of Natural Language with Video, Thesis" (2015), 144 pages.*

Balagopalam, A. et al.,"Automatic Keyphrase Extraction and Segmentation of Video Lectures," (2012), IEEE, 10 pages.*

Saggion, Horacio, Abura'Ed, Ahmed, Ronzano, Francesco, Trainable Citation-enhanced Summarization of Scientific Articles, BIRNDL 2016 Joint Workshop on Bibliometric-enhanced Information Retrieval and NLP for Digital Libraries (Jun. 2016).

Amjad Abu-Jbara and Dragomir Radev. 2011. Coherent citation-based summarization of scientific papers. In Proceedings of the 49th Annual Meeting of the Association for Computational Linguistics: Human Language Technologies—vol. 1, HLT '11, pp. 500-509.

Roee Aharoni and Yoav Goldberg. 2018. Split and rephrase: Better evaluation and stronger baselines. In Proceedings of the 56th Annual Meeting of the Association for Computational Linguistics (vol. 2: Short Papers), pp. 719-724. Association for Computational Linguistics.

Bamdad Bahrani and Min-Yen Kan. 2013. Multimodal alignment of scholarly documents and their presentations. In Proceedings of the 13th ACM/IEEE-CS Joint Conference on Digital Libraries, JCDL '13, pp. 281-284.

Piotr Bojanowski, Remi Lajugie, Edouard Grave, Francis Bach, Ivan Laptev, Jean Ponce, and Cordelia Schmid. 2015. Weakly-supervised alignment of video with text. In The IEEE International Conference on Computer Vision (ICCV).

Yen-Chun Chen and Mohit Bansal. 2018. Fast abstractive summarization with reinforce-selected sentence rewriting. In Proceedings of the 56th Annual Meeting of the Association for Computational Linguistics (vol. 1: Long Papers), pp. 675-686. Association for Computational Linguistics.

Jianpeng Cheng and Mirella Lapata. 2016. Neural summarization by extracting sentences and words. In Proceedings of the 54th Annual Meeting of the Association for Computational Linguistics (vol. 1: Long Papers), pp. 484-494.

Arman Cohan and Nazli Goharian. 2018. Scientific document summarization via citation contextualization and scientific discourse. International Journal on Digital Libraries, pp. 287-303.

Ed Collins, Isabelle Augenstein, and Sebastian Riedel. 2017. A supervised approach to extractive summarisation of scientific papers. In Proceedings of the 21st Conference on Computational Natural Language Learning (CoNLL 2017), pp. 195-205.

Kokil Jaidka, Muthu Kumar Chandrasekaran, Sajal Rustagi, and Min-Yen Kan. 2016. Overview of the cl-scisumm 2016 shared task. In In Proceedings of Joint Workshop on Bibliometric-enhanced information Retrieval and NLP for Digital Libraries (BIRNDL 2016).

Kokil Jaidka, Michihiro Yasunaga, Muthu Kumar Chandrasekaran, Dragomir Radev, and Min-Yen Kan. 2018. The cl-scisumm shared task 2018: Results and key insights. In Proceedings of the 3rd Joint Workshop on Bibliometric-enhanced Information Retrieval and Natural Language Processing for Digital Libraries (BIRNDL).

Min-Yen Kan. 2007. Slideseer: A digital library of aligned document and presentation pairs. In Proceedings of the 7th ACM/IEEE-CS Joint Conference on Digital Libraries, JCDL '07, pp. 81-90.

Jonathan Malmaud, Jonathan Huang, Vivek Rathod, Nicholas Johnston, Andrew Rabinovich, and Kevin Murphy. 2015. What's cookin'? interpreting cooking videos using text, speech and vision. In Proceedings of the 2015 Conference of the North American Chapter of the Association for Computational Linguistics: Human Language Technologies, pp. 143-152. Association for Computational Linguistics.

Preslav I. Nakov, Ariel S. Schwartz, and Marti A. Hearst. 2004. Citances: Citation sentences for semantic analysis of bioscience text. In In Proceedings of the SIGIR?04 workshop on Search and Discovery in Bioinformatics.

Michael Pfeiffer, Nikola Nikolov and Richard Hahnloser. 2018. Data-driven summarization of scientific articles. In Proceedings of the Eleventh International Conference on Language Resources and Evaluation (LREC 2018).

Jeffrey Pennington, Richard Socher, and Christopher D. Manning. 2014. Glove: Global vectors for word representation. In In EMNLP.

Abigail See, Peter J. Liu, and Christopher D. Manning. 2017. Get to the point: Summarization with pointergenerator networks. In Proceedings of the 55th Annual Meeting of the Association for Computational Linguistics (vol. 1: Long Papers), pp. 1073-1083.

Zhongyu Wei and Wei Gao. 2014. Utilizing microblogs for automatic news highlights extraction. In Proceedings of COLING 2014, the 25th International Conference on Computational Linguistics: Technical Papers, pp. 872-883. Dublin City University and Association for Computational Linguistics.

Zhongyu Wei and Wei Gao. 2015. Gibberish, assistant, or master?: Using tweets linking to news for extractive single-document summarization. In Proceedings of the 38th International ACM SIGIR Conference on Research and Development in Information Retrieval, SIGIR '15, pp. 1003-1006.

Michihiro Yasunaga, Jungo Kasai, Rui Zhang, Alexander Fabbri, Irene Li, Dan Friedman, and Dragomir Radev. 2019. Scisummnet: A large annotated corpus and content-impact models for scientific paper summarization with citation networks. In Proceedings of AAAI 2019.

(56) References Cited

OTHER PUBLICATIONS

Yukon Zhu, Ryan Kiros, Rich Zemel, Ruslan Salakhutdinov, Raquel Urtasun, Antonio Torralba, and Sanja Fidler. 2015. Aligning books and movies: Towards story-like visual explanations by watching movies and reading books. In The IEEE International Conference on Computer Vision (ICCV).

* cited by examiner

Fig. 1

Title Split and Rephrase: Better Evaluation and Stronger Baselines (Aharoni and Goldberg, 2018) — 102A

Paper Processing long, complex sentences is challenging. This is true either for humans in various circumstances or in NLP tasks like parsing and machine translation. An automatic system capable of breaking a complex sentence into several simple sentences that convey the same meaning is very appealing. A recent work by Narayan et al. (2017) introduced a dataset, evaluation method and baseline systems for the task, naming it Split-and-Rephrase. The dataset includes 1,066,115 instances mapping a single complex sentence to a sequence of sentences that express the same meaning, together with RDF triples that describe their semantics. They considered two . . . Indeed, feeding the model with examples containing entities alone without any facts about them causes it to output perfectly phrased but unsupported facts (Table 3). Digging further, we find that 99% of the simple sentences (more than 89% of the unique ones) in the validation and test sets also appear in the training set, which coupled with the good memorization capabilities of SEQ2SEQ models and the relatively small number of distinct simple sentences helps to explain the high BLEU score. To aid further research on the task, we propose a more challenging split of the data. We also establish a stronger baseline by extending the SEQ2SEQ approach with a copy mechanism, which was shown . . . We encourage future work on the split-and-rephrase task to use our new data split or the v1.0 split instead of the original one.

— 102B
— 102C
— 102D
— 102E

102

Talk Transcript let's begin with the motivation so processing long complex sentences is a hard task this is true for arguments like children people with reading disabilities second language learners but this is also true for sentence level and NLP systems, for example previous work show that dependency parsers degrade performance when they're introduced with longer and longer sentences, in a similar result was shown for neural machine translation, where neural machine translation systems introduced with longer sentences starting degrading performance. the question rising here is can we automatically break a complex sentence into several simple ones while preserving the meaning or the semantics and this can be a useful component in NLP pipelines. For example, the split and rephrase task was introduced in the last EMNLP by Narayan, Gardent and Shimarina, where they introduced a dataset, an evaluation method and baseline models for this task. The task definition can be taking a complex sentence and breaking it into several simple ones with the same meaning For example, . . . semantics units in the source sentence and then rephrasing those units into a single sentences on the target site. In this work we first show the simple neural models seem to perform very well on the original benchmark, but this is only due to memorization of the training set we propose a more challenging data split for the task to discourage this memorization and we perform automatic evaluation in error analysis on the new benchmark showing that the task is still very far from being solved.

— 104A
— 104B
— 104C
— 104D
— 104E

104

100

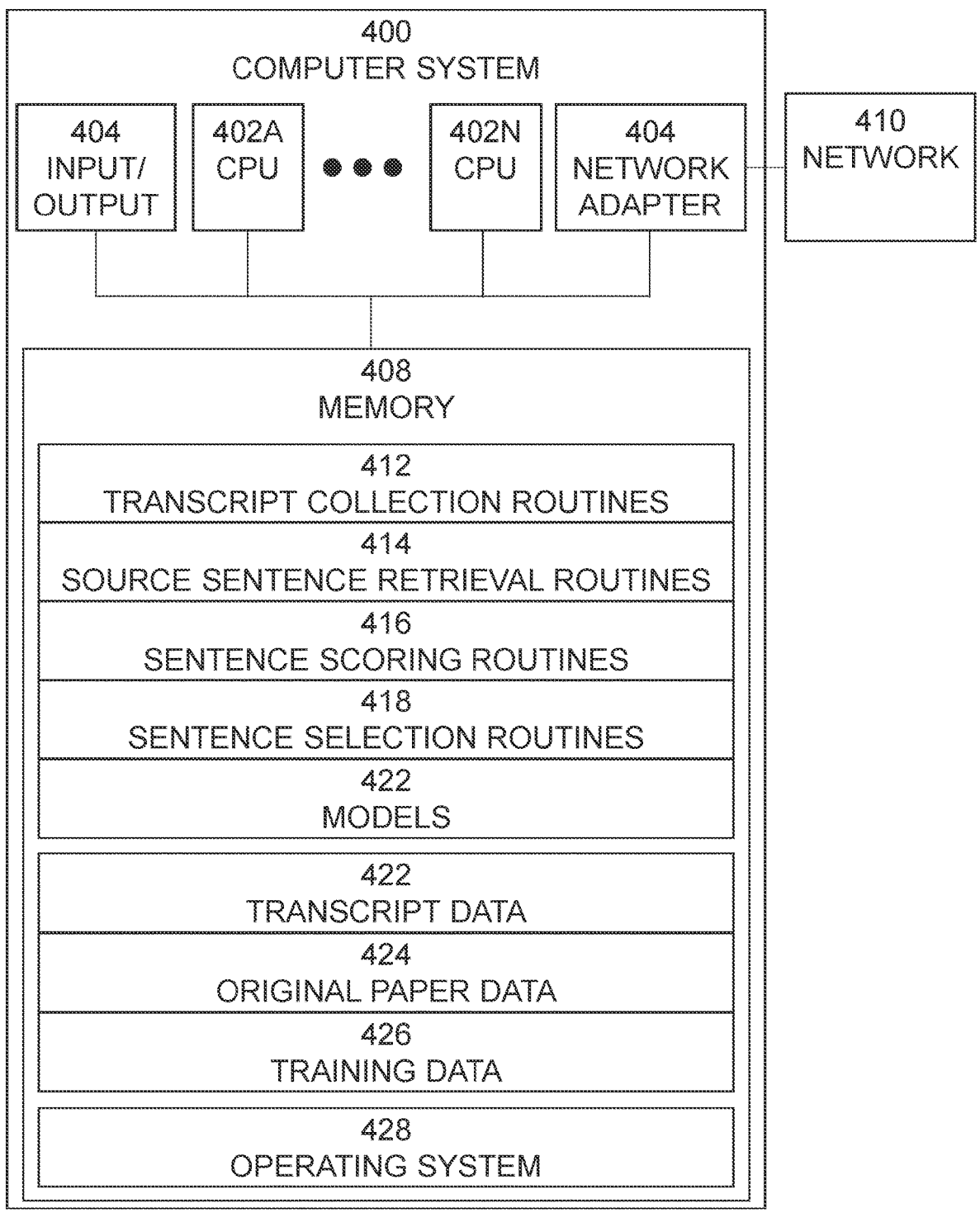

AUTOMATIC GENERATION OF TRAINING DATA FOR SCIENTIFIC PAPER SUMMARIZATION USING VIDEOS

BACKGROUND

The present invention relates to techniques to generate training data for summarization of complex papers, such as scientific papers, that are scalable to provide large scale training data.

The rate of publication of scientific papers is increasing to the point that it is almost impossible for researchers to keep up with relevant research. Automatic text summarization could help mitigate this problem. In general, there are two common approaches to summarizing scientific papers: citations-based, based on a set of citation sentences, and content-based, based on the paper itself. Automatic summarization has been performed for the news domain, while summarization of scientific papers has been less studied, mainly due to the lack of largescale training data. The length and complexity of scientific papers require substantial summarization effort from experts. Several methods have been suggested to reduce these efforts, but they are not scalable as they require human annotations.

Currently, no large-scale training data is available for the task of scientific paper summarization. Current approaches have drawbacks. For example, using the Abstract of a paper approach may generate a summary that is too high-level.

Accordingly, a need arises for techniques to generate training data for summarization of complex papers, such as scientific papers, that are scalable to provide large scale training data.

SUMMARY

Embodiments may provide techniques to generate training data for summarization of complex documents, such as scientific papers, articles, etc., that are scalable to provide large scale training data. Embodiments of the present systems and methods may utilize video or audio recording of presentations of such complex documents to automatically generate extractive content-based summaries for scientific papers. Embodiments may utilize transcripts of video content of conference talks, and treat them as spoken summaries of papers. Then, using unsupervised alignment algorithms, embodiments may map the transcripts to the corresponding papers' text, and create extractive summaries. Such automatically generated summary data may be used to train one or more machine learning models to be used to generate summaries of additional documents For example, in an embodiment, a method may be implemented in a computer system that may comprise a processor, memory accessible by the processor, and computer program instructions stored in the memory and executable by the processor, the method may comprise collecting, at the computer system, a plurality of video and audio recordings of presentations of documents, collecting, at the computer system, a plurality of documents corresponding to the video and audio recordings, converting, at the computer system, the plurality of video and audio recordings of presentations of documents into transcripts of the plurality of presentations, generating, at the computer system, a summary of each document by selecting a plurality of sentences from each document using the transcript of the that document, generating, at the computer system, a dataset comprising a plurality of the generated summaries, and training, at the computer system, a machine learning model using the generated dataset.

In embodiments, selecting a plurality of sentences may comprise modeling the generative process using a hidden Markov model. Each hidden state of the hidden Markov model may correspond to a single sentence of the document and the sequence of spoken words from the transcripts may correspond to the output sequence of the hidden Markov model. The hidden Markov model may have emission probabilities based on a semantic similarity measure between words, based on word-vector distance, transition probabilities that model probabilities of transitions between sentences, and start-probabilities based on an assumption that the summary must start with a sentence from an Introduction section of the document. Sentences from Abstract, Related Work, and Acknowledgments sections of each document may be excluded from the hidden states of the hidden Markov model. The method may further comprise finding a most likely hidden state sequence using a Viterbi algorithm. Each word in the transcript may define a time-step and selecting a plurality of sentences may further comprise scoring each sentence based on a number of time-steps in which each sentence appears and selecting top scoring sentences to appear in the summary up a predetermined summary length.

In an embodiment, a system may comprise a processor, memory accessible by the processor, and computer program instructions stored in the memory and executable by the processor to perform collecting a plurality of video and audio recordings of presentations of documents, collecting a plurality of documents corresponding to the video and audio recordings, converting the plurality of video and audio recordings of presentations of documents into transcripts of the plurality of presentations, generating a summary of each document by selecting a plurality of sentences from each document using the transcript of the that document, generating a dataset comprising a plurality of the generated summaries, and training a machine learning model using the generated dataset.

In an embodiment, a computer program product may comprise a non-transitory computer readable storage having program instructions embodied therewith, the program instructions executable by a computer, to cause the computer to perform a method that may comprise collecting, at the computer system, a plurality of video and audio recordings of presentations of documents, collecting, at the computer system, a plurality of documents corresponding to the video and audio recordings, converting, at the computer system, the plurality of video and audio recordings of presentations of documents into transcripts of the plurality of presentations, generated, at the computer system, a summary of each document by selecting a plurality of sentences from each document using the transcript of the that document, generating, at the computer system, a dataset comprising a plurality of the generated summaries, and training, at the computer system, a machine learning model using the generated dataset.

BRIEF DESCRIPTION OF THE DRAWINGS

The details of the present invention, both as to its structure and operation, can best be understood by referring to the accompanying drawings, in which like reference numbers and designations refer to like elements.

FIG. 1 illustrates an example of an alignment between a paper (or other complex document) and its talk transcript, which may be utilized by embodiments of the present systems and methods may be implemented.

FIG. 4 is an exemplary block diagram of a computer system, in which processes involved in the embodiments described herein may be implemented.

DETAILED DESCRIPTION

Embodiments may provide techniques to generate training data for summarization of complex documents, such as scientific papers, etc., that are scalable to provide large scale training data.

Recently, academic conferences have started publishing videos of talks (for example, ACL1, EMNLP1, ICML2, and more). In such talks, the presenter (usually a co-author) typically describes their paper coherently and concisely (since there is a time limit), providing a good basis for generating summaries. Embodiments of the present systems and methods may utilize such videos to automatically generate extractive content-based summaries for scientific papers. Embodiments may utilize transcripts of video content of conference talks, and treat them as spoken summaries of papers. Then, using unsupervised alignment algorithms, embodiments may map the transcripts to the corresponding papers' text, and create extractive summaries.

An example of an alignment 100 between a paper 102 (or other complex document) and its talk transcript 104 is shown in FIG. 1. For example, portion 102A of paper 102 may correspond to portion 104A of talk transcript 104. Likewise, portion 102B of paper 102 may correspond to portion 104B of talk transcript 104, portion 102C of paper 102 may correspond to portion 104C of talk transcript 104, portion 102D of paper 102 may correspond to portion 104D of talk transcript 104, and portion 102E of paper 102 may correspond to portion 104E of talk transcript 104.

Embodiments utilizing generated summaries may then be used to train more complex and data demanding summarization models. Although such summaries may be noisy (as they are created automatically from transcripts), the dataset can easily grow in size as more conference videos are aggregated. Moreover, embodiments may generate summaries of various lengths. Thus, embodiments may automatically generate summaries for scientific papers based on video talks, embodiments may create a new dataset, that may contain multiple summaries for papers, which can be used as training data, and embodiments may provide evaluations for the approach. Thus, embodiments may automatically create extractive summaries for scientific papers by utilizing the videos of conference talks.

Recently, many computer science academic associations including ACL, ACM, IMLS and more, have started recording talks presented at different conferences, such as ACL, NAACL, EMNLP, and other collocated workshops. A similar trend may occur in other domains such as Physics, Biology, etc. In a conference, each speaker (usually a coauthor) presents their paper given a timeframe of 15-20 minutes. Thus, the talk must be coherent and concentrate on the most important aspects of a paper. Hence, the talk may be considered as a summary of the paper, as viewed by its authors, and is much more comprehensive than the abstract, which is written by the authors as well.

Figure 2:
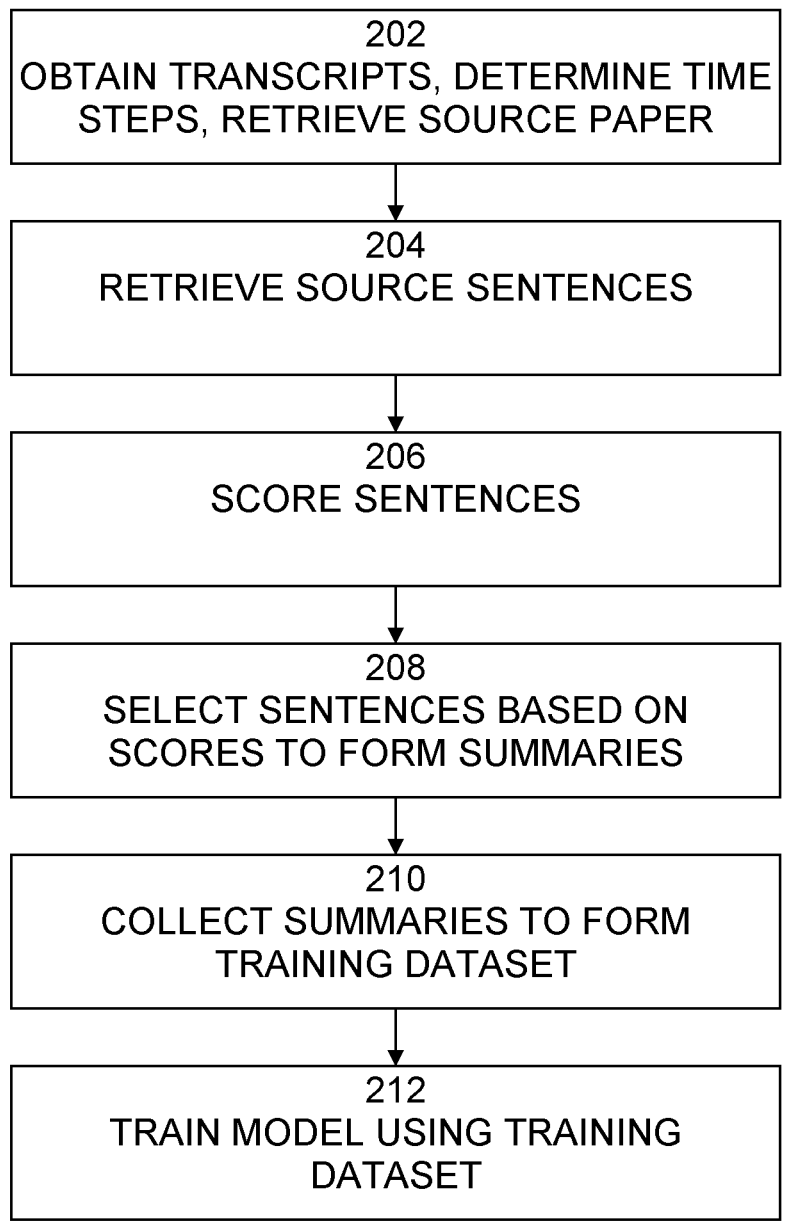
FIG. 2 is an exemplary flow diagram of a process of modeling the alignment between spoken words in the transcript and sentences in the paper according to embodiments of the present techniques.
Figure 3:
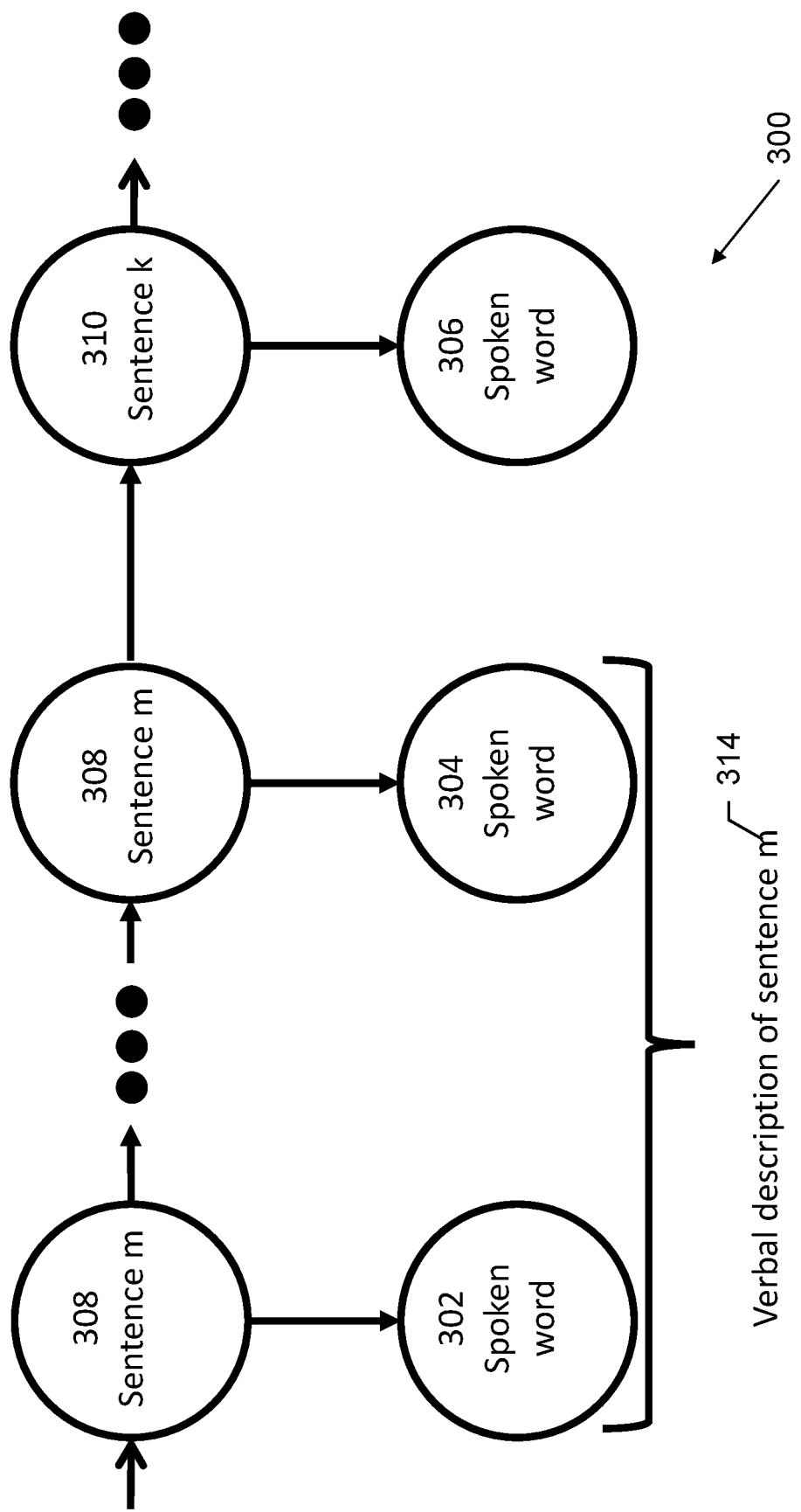
FIG. 3 is an exemplary illustration of an assumed speaker's behavior, in accordance with embodiments of the present systems and methods.

Typically, the transcript itself cannot serve as a good summary for the corresponding paper, as it constitutes only one modality of the talk (which also consists of slides, for example), and hence cannot stand by itself and form a coherent written text. Thus, to create an extractive paper summary based on the transcript, embodiments may model the alignment between spoken words in the transcript and sentences in the paper, using, for example, a generative process 200, such as that shown in FIG. 2. It is best viewed in conjunction with FIG. 3, which illustrates an assumed speaker's behavior 300. Process 200 begins with 202, in which a transcript of a talk may be obtained, for example, based on a video or audio recording of the talk. The video or audio recording may be transcribed, for example, using Automatic Speech Recognition (ASR), human transcription, or a combination of automatic and human transcription. For example, a publicly available ASR service may be used to extract transcripts of talks from video or audio recordings. Based on the recording metadata, such as the title, the corresponding paper may be retrieved, for example, in PDF format. The text of the paper may be extracted, for example, using Science-Parse, and a simple filtering processing may be applied in order to filter-out some noise, such as lines starting with the word "Copyright", etc. At the end of this process, the text of each paper may be associated with the transcript of the corresponding talk.

During the talk, the speaker typically generates words, such as spoken words 302, 304, 306, for verbally describing sentences, such as sentence m 308 and sentence k 310, from the paper, one word at each time step. Thus, at each time step, determined at 202, the speaker has a single sentence from the paper in mind, and produces a word that constitutes a part of its verbal description, such as the verbal description 314 of sentence m 308. Then, at the next time-step, the speaker either stays with the same sentence, or moves on to describing another sentence, and so on. Thus, given a transcript, At 204, embodiments may retrieve those "source" sentences and consider them for use in the summary. At 206, each retrieved sentence may be scored. For example, the number of words uttered to describe each sentence may serve as an importance score, indicating the amount of time the speaker spent describing the sentence. This enables control of the summary length by including only the most important sentences up to some threshold. Thus, at 208, sentences may be selected based on their score and a summary of each article may be generated. At 210, a plurality of generated summaries may be collected to form a training dataset. At 212, the training dataset may be used to train one or more machine learning models to be used to generate summaries of additional documents.

Embodiments may use a hidden Markov model (HMM) to model the generative process of 204, retrieving source sentences based on the spoken words. The sequence of spoken words may be the output sequence. Each hidden state of the HMM may correspond to a single paper sentence. The HMM's probabilities may be defined as follows.

Denote by Y (1:T) the spoken words, and by $S(t) \in \{1, \ldots, K\}$ the paper sentence index at time-step $t \in \{1, \ldots, T\}$. The emission probabilities may be defined as:

$$p(Y(t) = y | S(t) = k) \propto \max_{w \in words(k)} sim(y, w)$$

where words(k) is the set of words in the k'th sentence, and sim is a semantic similarity measure between words, based on word-vector distance. Embodiments may use a pre-trained GloVe as the semantic vector representations for words.

As for the transition probabilities, the speaker's behavior and the transitions between any two sentences may be modeled. This is unlike a simpler setting in in which transition is allowed between consecutive sentences only. To do so, denote the entries of the transition matrix by $T(k, l)=p(S(t+1)=l|S(t)=k)$. The following assumptions may be relied upon: (1) $T(k, k)$ (the probability of staying in the same sentence at the next time-step) is relatively high. (2) There is an inverse relation between $T(k, l)$ and $|l-k|$, i.e., it is more probable to move to a nearby sentence than jumping to a farther sentence. (3) $S(t+1)>S(t)$ is more probable than the opposite (i.e., transition to a later sentence is more probable than to an earlier one). Although these assumptions do not perfectly reflect reality, they are a reasonable approximation in practice.

Following these assumptions, the HMM's transition probability matrix may be defined. First, define the stay probability as $$\alpha = \max\left(\delta\left(1 - \frac{K}{T}\right), \epsilon\right),$$

where $\delta, \epsilon \in (0, 1)$. This choice of stay probability may use $\delta$ to fit it to the case where transitions between any two sentences are allowed, and $\epsilon$ to handle rare cases where K is close to, or even larger than T The entries in the transition matrix may be denoted by $T(k,m)=p(S(t+1)=m\ S(t)=k)$. Then, for each sentence index $k \in \{1, \ldots, K\}$, define:

$T(k,k)=\alpha$ $T(k,k+j)=\beta_k \cdot \lambda^{j-1}, j \geq 1$ $T(k,k-j)=\gamma \cdot \beta_k \cdot \lambda^{j-1}, j \geq 1$ where $\lambda, \gamma, \beta_k \in (0, 1)$, $\lambda$ and $\gamma$ are factors reflecting assumptions (2) and (3) respectively, and for all k, $\beta_k$ is normalized such that $\Sigma_{l=1}^{K} T(k, l)=1$. The values of $\lambda$, $\gamma$, $\delta$ and $\epsilon$ were fixed throughout the experiments at $\lambda=0.75$, $\gamma=0.5$, $\delta=0.33$ and $\epsilon=0.1$. The average value of $\alpha$, across all papers, was around 0.3. The values of these parameters were determined based on evaluation over manually-labeled alignments between the transcripts and the sentences of a small set of papers.

Finally, define the start-probabilities assuming that the first spoken word must be conditioned on a sentence from the Introduction section, hence $p(S(1))$ may be defined as a uniform distribution over the Introduction section's sentences. In embodiments, sentences which appear in the Abstract, Related Work, and Acknowledgments sections of each paper may be excluded from the HMM's hidden states, as it may be observed that presenters seldom refer to them. To estimate the MAP sequence of sentences, the Viterbi algorithm may be applied to find the most likely hidden state sequence. The sentences in the obtained sequence may be the candidates for the paper's summary. At 206 the sentences in the sequence may be scored for each sentence s appearing in this sequence, denote by count(s) the number of time-steps in which this sentence appears. Thus, count(s) models the number of words generated by the speaker conditioned on s, and, hence, may be used as an importance score. Given a desired summary length, one can draw a subset of top-ranked sentences up to this length.

EXPERIMENTS

Experimental Setup

Data for Evaluation. The quality of embodiments of dataset generation was evaluated by training an extractive summarization model, and evaluating this model on a human-generated dataset of scientific paper summaries. For this exemplary evaluation, we choose the CL-SciSumm shared task (Jaidka et al., 2016, 2018), as this is the most established benchmark for scientific paper summarization. In this dataset, experts wrote summaries of 150 words length on average, after reading the whole paper. The evaluation is on the same test data used by Yasunaga et al. (2019), namely 10 examples from CL-SciSumm 2016, and 20 examples from CLSciSumm 2018 as validation data.

Training Data. Using the HMM importance scores, four training sets were created, two with fixed-length summaries (150 and 250 words), and two with fixed ratio between summary and paper lengths (0.3 and 0.4). Models were trained on each training set, and the model yielding the best performance on the validation set was selected (evaluation was done with generating a 150-words summary).

Summarization Model. An extractive summarization model was trained on our TALKSUMM dataset, using the extractive variant of Chen and Bansal (2018). Two summary generation approaches were tested, similarly to Yasunaga et al. (2019). First, for TALKSUMM-ONLY, a 150-words summary was generated out of the top-ranked sentences extracted by the trained model (sentences from the Acknowledgments section are omitted, in case the model extracts any). In the second approach, a 150-words summary was created by augmenting the abstract with non-redundant sentences extracted by the model, similarly to the "Hybrid 2" approach of Yasunaga et al. (2019). Early-stopping and hyper-parameters tuning was performed using the validation set.

Baselines. The results were compared to SCISUMMNET (Yasunaga et al., 2019) trained on 1000 scientific papers summarized by human annotators. As the same test set was used as in Yasunaga et al. (2019), their reported model performance was directly compared, including their ABSTRACT baseline which takes the abstract to be the paper's summary.

Results

Automatic Evaluation. Table 1 summarizes the results: both GCN CITED TEXT SPANS and TALKSUMM-ONLY models, are not able to obtain better performance than ABSTRACT8.

TABLE 1

ROUGE scores on the CL-SciSumm 2016 test benchmark.

| Model | 2-R | 2-F | 3-F | SU4-F |
|---|---|---|---|---|
| TALKSUMM-HYBRID | 35.05 | 34.11 | 27.19 | 24.13 |
| TALKSUMM-ONLY | 22.77 | 21.94 | 15.94 | 12.55 |
| GCN HYBRID 2* | 32.44 | 30.08 | 23.43 | 23.77 |
| GCN CITED TEXT SPANS* | 25.16 | 24.26 | 18.79 | 17.67 |
| ABSTRACT* | 29.52 | 29.4 | 23.16 | 23.34 |

*results from Yasunaga et al. (2019).

However, for the Hybrid approach, where the abstract is augmented with sentences from the summaries emitted by the models, our TALKSUMM-HYBRID outperforms both GCN HYBRID 2 and ABSTRACT. Importantly, the model, trained on automatically generated summaries, performs on par with models trained over SCISUMMNET, in which training data was created manually. Human Evaluation. A human evaluation of the approach was conducted with support from authors who presented their papers in conferences. In order to test more comprehensive summaries, summaries composed of 30 sentences were generated (approximately 15% of a long paper). 15 presenters were randomly selected from the corpus and asked to perform two tasks, given the generated summary of their paper: (1) for each sentence in the summary, indicate whether they considered it when preparing the talk (yes/no question); and (2) globally evaluate the quality of the summary (1-5 scale, ranging from very bad to excellent, 3 means good). For the sentence-level task (1), 73% of the sentences were considered while preparing the talk. As for the global task (2), the quality of the summaries was 3.73 on average, with standard deviation of 0.725. These results validate the quality of embodiments of the generation method.

Conclusion. Embodiments may provide a novel automatic method to generate training data for scientific papers summarization, based on conference talks given by authors. A model trained on an automatically generated dataset may achieve competitive results compared to models trained on human generated summaries, and the dataset quality may satisfy human experts.

A further example of an alignment 100 between a paper 102 and its talk transcript 104 as shown in FIG. 1 is shown in Table 4 below. Table 4 shows the alignment obtained using the HMM. Each row in this table corresponds to an interval of consecutive time-steps, such as a sub-sequence of the transcript, in which the same paper sentence was selected by the Viterbi algorithm. The first column (Paper Sentence) shows the selected sentences; The second column (ASR transcript) shows the transcript obtained by the ASR system; The third column (Human transcript) shows the manually corrected transcript, which is provided for readability (our model predicted the alignment based on the raw ASR output); Finally, the forth column shows whether the model has correctly aligned a paper sentence with a sub-sequence of the transcript. Rows with no values in this column correspond to transcript sub-sequences that were not associated with any paper sentence in the manually labeled alignment.

TABLE 2

Alignment obtained using the HMM, for the Introduction section and first 2:40 minutes of the video's transcript.

| Paper Sentence | ASR transcript | Human transcript | |
|---|---|---|---|
| Processing long, complex sentences is challenging. | base begin motivation processing long complex sentences hard task | Let's begin with the motivation so processing long complex sentences is a hard task | X |
| This is true either for humans in various circumstances or in NLP tasks like parsing and machine translation. | true arguments like children people reading disabilities second language learners also true first sentence level p system | this is true for arguments like children people with reading disabilities second language learners but this is also true for sentence level and NLP systems | X |
| Arecentworkby Narayan et al. (2017) introduced a dataset, evaluation method and baseline systems for the task, naming it Split-and Rephrase. | previous work show data tendency parsers great performance introduced longer sentences | previous work show that dependency parsers degrade performance when they're introduced with longer and longer sentences | X |
| This is true either for humans in various circumstances or in NLP tasks like parsing and machine translation. | similar results showing new machine translation new machine translation | similar result was shown for neural machine translation where neural machine translation | X |
| An automatic system capable of breaking a complex sentence into several simple sentences that convey the same meaning is very appealing. | systems introduced longer sentences starting performance question rising automatically break complex sentence several simple ones preserving meaning semantics useful company p like example | systems introduced with longer sentences starting degrading performance the question rising here is can we automatically break a complex sentence into several simple ones while preserving the meaning or the semantics and this can be a useful component in NLP pipelines for example | X |
| Arecentworkby Narayan et al. (2017) introduced a dataset, evaluation method and baseline systems for the task, naming it Split-and Rephrase. | leader task introduced last 'll bynari guard going marina introduced data sets evaluation method baseline models task | the split and rephrase task was introduced in the last EMNLP by Narayan Gardent and Shimarina where they introduced a dataset an evaluation method and baseline models for this task | X |

TABLE 2-continued

Alignment obtained using the HMM, for the Introduction section and first 2:40 minutes of the video's transcript.

| Paper Sentence | ASR transcript | Human transcript | |
|---|---|---|---|
| An automatic system capable of breaking a complex sentence into several simple sentences that convey the sam meaning is very appealing. | phoenician taking complex sentences break several simple ones example take sentence alan joined nasa nineteen sixty three became member apollo twelve mission along word inspect pilot got commander would like break sentence sentences go alan serves crew member twelve word better polls commanded david scott selected nasa nineteen sixty three | the task definition can be taking a complex sentence and break it into several simple ones for example if you take the sentence Alan being joined NASA in nineteen sixty three where he became a member of the Apollo twelve mission along with Alfa Worden and his back a pilot and they've just got its commander who would like to break the sentence into four sentences which can go as Alan bean serves as a crew member of Apollo twelve Alfa Worden was the back pilot will close it was commanded by David Scott now be was selected by NASA in nineteen sixty three | |
| Arecentworkby Narayan et al. (2017) introduced a dataset, evaluation method and baseline systems for the task, naming it Split-and Rephrase. | see task requires first identifying independence imagic units | we can see that the task requires first identifying independence semantics units | |
| The dataset includes 1,066,115 instances mapping a single complex sentence to a sequence of sentences that express the same meaning, together with RDF triples that describe their semantics. | source sentence rephrasing units single sentences target | in the source sentence and then rephrasing those units into a single sentences on the target site | |
| Digging further, we find that 99% of the simple sentences (more than 89% of the unique ones) in the validation and test sets also appear in the training set, which coupled with the good memorization capabilities of SEQ2SEQ models and the relatively small number of distinct simple sentences helps to explain the high BLEU score. | work first show simple neural models seem perform well original benchmark due memorization training set | In this work we first show the simple neural models seem to perform very well on the original benchmark but this is only due to memorization of the training set | X |
| To aid further research on the task, we propose a more challenging split of the data. | perform close challenging data split task discourage instant memorization perform automatic evaluation analysis new benchmark showing task still far | we propose a more challenging data split for the task to discourage this memorization and we perform automatic evaluation in error analysis on the new benchmark showing that the task is still very far from being solved | X |

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include transcript collection routines 412, source sentence retrieval routines 414, sentence scoring routines 416, sentence selection routines 418, models 420, transcript data 422, original paper data 424, training data 426, and operating system 428. Transcript collection routines 412 may include software routines to collect transcripts 422 of presentations of papers, as described above. Source sentence retrieval routines 414 may include software routines to retrieve source sentences from original papers 424 based on words present in transcripts 422 of presentations of papers, as described above. Sentence scoring routines 416 may include software routines to score sentences based on importance, as described above. Sentence selection routines 418 may include software routines to select sentences using importance scores to generate training data 426, as described above. Models 420 may include machine learning models to be trained using training data 426, as described above. Operating system 428 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, and computer program instructions stored in the memory and executable by the processor, the method comprising:
    collecting, at the computer system, a plurality of video and audio recordings of presentations of documents;
    collecting, at the computer system, a plurality of documents corresponding to the video and audio recordings;
    converting, at the computer system, the plurality of video and audio recordings of presentations of documents into transcripts of the plurality of presentations;
    generating, at the computer system, a summary of each document by selecting a plurality of sentences from each document using the transcript of the document, wherein the selecting step comprises using a hidden Markov model, wherein each hidden state of the hidden Markov model corresponds to a single sentence of the document, a sequence of spoken words from the transcripts corresponds to an output sequence of the hidden Markov model, and wherein the hidden Markov model has:
        emission probabilities based on a semantic similarity measure between words based on word-vector distance,
        transition probabilities that model probabilities of transitions between sentences, and
        start-probabilities based on an assumption that a first spoken word of the sequence of spoken words must be conditioned on a sentence from an Introduction section of that document;
    generating, at the computer system, a dataset comprising a plurality of the generated summaries; and
    training, at the computer system, a machine learning model using the generated dataset.

2. The method of claim 1, wherein sentences from Abstract, Related Work, and Acknowledgments sections of each document are excluded from the hidden states of the hidden Markov model.

3. The method of claim 2, further comprising finding a most likely hidden state sequence using a Viterbi algorithm.

4. The method of claim 3, wherein each word in the transcript defines a time-step and selecting a plurality of sentences further comprises scoring each sentence based on a number of time-steps in which each sentence appears and selecting top scoring sentences to appear in the summary up a predetermined summary length.

5. A system comprising a processor, memory accessible by the processor, and computer program instructions stored in the memory and executable by the processor to perform:
   collecting a plurality of video and audio recordings of presentations of documents;
   collecting a plurality of documents corresponding to the video and audio recordings;
   converting the plurality of video and audio recordings of presentations of documents into transcripts of the plurality of presentations;
   generating a summary of each document by selecting a plurality of sentences from each document using the transcript of the document, wherein the selecting step comprises using a hidden Markov model, wherein each hidden state of the hidden Markov model corresponds to a single sentence of the document, a sequence of spoken words from the transcripts corresponds to an output sequence of the hidden Markov model, and wherein the hidden Markov model has:
      emission probabilities based on a semantic similarity measure between words based on word-vector distance,
      transition probabilities that model probabilities of transitions between sentences, and
      start-probabilities based on an assumption that a first spoken word of the sequence of spoken words must be conditioned on a sentence from an Introduction section of that document;
   generating a dataset comprising a plurality of the generated summaries; and
      training, at the computer system, a machine learning model using the generated dataset.

6. The system of claim 5, wherein sentences from Abstract, Related Work, and Acknowledgments sections of each document are excluded from the hidden states of the hidden Markov model.

7. The system of claim 6, further comprising finding a most likely hidden state sequence using a Viterbi algorithm.

8. The system of claim 7, wherein each word in the transcript defines a time-step and selecting a plurality of sentences further comprises scoring each sentence based on a number of time-steps in which each sentence appears and selecting top scoring sentences to appear in the summary up a predetermined summary length.

9. A computer program product comprising a non-transitory computer readable storage having program instructions embodied therewith, the program instructions executable by a computer, to cause the computer to perform a method comprising:
   collecting, at the computer system, a plurality of video and audio recordings of presentations of documents;
   collecting, at the computer system, a plurality of documents corresponding to the video and audio recordings;
   converting, at the computer system, the plurality of video and audio recordings of presentations of documents into transcripts of the plurality of presentations;
   generating, at the computer system, a summary of each document by selecting a plurality of sentences from each document using the transcript of that document, wherein the selecting step comprises using a hidden Markov model, wherein each hidden state of the hidden Markov model corresponds to a single sentence of the document, a sequence of spoken words from the transcripts corresponds to an output sequence of the hidden Markov model, and wherein the hidden Markov model has:
   emission probabilities based on a semantic similarity measure between words based on word-vector distance,
   transition probabilities that model probabilities of transitions between sentences, and
   start-probabilities based on an assumption that a first spoken word of the sequence of spoken words must be conditioned on a sentence from an Introduction section of that document;
   generating, at the computer system, a dataset comprising a plurality of the generated summaries; and
   training, at the computer system, a machine learning model using the generated dataset.

10. The computer program product of claim 9, wherein sentences from Abstract, Related Work, and Acknowledgments sections of each document are excluded from the hidden states of the hidden Markov model.

11. The computer program product of claim 10, further comprising finding a most likely hidden state sequence using a Viterbi algorithm and wherein each word in the transcript defines a time-step and selecting a plurality of sentences further comprises scoring each sentence based on a number of time-steps in which each sentence appears and selecting top scoring sentences to appear in the summary up a predetermined summary length.

\* \* \* \* \*